(12) United States Patent
Kang

(10) Patent No.: US 11,405,209 B2
(45) Date of Patent: Aug. 2, 2022

(54) APPARATUS FOR CONTROLLING AUTHENTICATION AND METHOD OF OPERATING SAME

(71) Applicant: SK PLANET CO., LTD., Gyeonggi-do (KR)

(72) Inventor: Ki Chon Kang, Seoul (KR)

(73) Assignee: SK PLANET CO., LTD., Gyeonggi-Do (KR)

( * ) Notice: Subject to any disclaimer, the term of this patent is extended or adjusted under 35 U.S.C. 154(b) by 377 days.

(21) Appl. No.: 16/502,276

(22) Filed: Jul. 3, 2019

(65) Prior Publication Data
US 2020/0014539 A1 Jan. 9, 2020

(30) Foreign Application Priority Data

Jul. 6, 2018 (KR) .................... 10-2018-0078975

(51) Int. Cl.
*H04L 9/32* (2006.01)
*H04L 9/08* (2006.01)
*H04L 29/08* (2006.01)
*H04L 67/52* (2022.01)
*H04W 12/63* (2021.01)

(52) U.S. Cl.
CPC .......... *H04L 9/3228* (2013.01); *H04L 9/0866* (2013.01); *H04L 67/18* (2013.01); *H04W 12/63* (2021.01)

(58) Field of Classification Search
CPC ...... H04L 9/3228; H04L 9/0866; H04L 67/18
See application file for complete search history.

(56) References Cited

U.S. PATENT DOCUMENTS

| 2012/0110071 A1* | 5/2012 | Zhou ...................... G06Q 30/02 709/204 |
| 2014/0289833 A1* | 9/2014 | Briceno .................. H04L 9/006 726/7 |
| 2017/0118225 A1* | 4/2017 | McGeehan ............. H04L 63/08 |

* cited by examiner

*Primary Examiner* — Noura Zoubair
(74) *Attorney, Agent, or Firm* — KED & Associates, LLP

(57) ABSTRACT

Disclosed are an apparatus for controlling authentication and a method of operating the same capable of increasing security and convenience in user authentication by authenticating a user through an authentication scheme that is determined differently according to space reliability of an authentication-processing space in which user authentication is processed.

13 Claims, 9 Drawing Sheets

APPARATUS FOR CONTROLLING AUTHENTICATION AND METHOD OF OPERATING SAME

CROSS-REFERENCE TO RELATED APPLICATIONS

This application is based upon and claims the benefit of priority from Korean Patent Application No. 10-2018-0078975, filed on Jul. 6, 2018, the entire contents of which are incorporated herein by reference.

BACKGROUND OF THE INVENTION

1. Field of the Invention

The present disclosure relates to a technology for authenticating a user through an authentication scheme that is determined differently according to space reliability of an authentication-processing space, which is a space in which authentication of the user is processed.

2. Description of the Prior Art

The development of IT devices, the expansion of various Fintech businesses, and the advent of the Internet of Things (IoT) form a boundless network world in which people and things are closely connected and thus interact with each other. The hyper-connected age, in which everything surrounding us communes with each other through communication on the basis of the Internet of Everything (IoE), is coming.

As the Internet environment expands from PCs to mobile devices, the use of Internet banking and simple payment services increases, and various Fintech businesses appear, protection of information and authentication for payment are not optional but absolutely necessary.

The conventional authentication scheme that we mainly use at present is a scheme using an ID and a password.

The ID and password scheme authenticates the user by sharing an ID and a password between the user and a server.

Thereafter, authentication such as a One-Time Password (OTP) or an accredited certificate has been introduced and markets based thereon have formed.

The development of authentication scheme may improve security but also reduce convenience, and thus there is a trade-off relationship therebetween.

Particularly, as the exposure of authentication environments has recently increased in the mobile environment, it is important to guarantee an authentication scheme for removing security threats and also securing convenience.

Accordingly, the present disclosure proposes a new authentication scheme for guaranteeing both security and convenience in a mobile environment.

SUMMARY OF THE INVENTION

The present disclosure has been made in order to solve the above-mentioned problems with the prior art, and an aspect of the present disclosure is to authenticate a user through an authentication scheme that is determined according to the reliability of an authentication-processing space, which is a space in which user authentication is processed.

In accordance with an aspect of the present disclosure, an apparatus for controlling authentication is provided. The apparatus includes: a processor configured to process authentication of a user; a memory configured to store at least one command executed through the processor, wherein the at least one command includes: an identification command of identifying an authentication-processing space, which is a space in which the authentication of the user is processed; a determination command of determining space reliability for the authentication-processing space on the basis of a correlation between the authentication-processing space and the user; and a control command of authenticating the user through an authentication scheme that is determined differently according to the space reliability for the authentication-processing space.

Specifically, the correlation between the authentication-processing space and the user may be based on the number of times that at least one of the user and other users who are associated with the user visit the authentication-processing space, and the determination command includes determining that the space reliability for the authentication-processing space is higher as the number of visits is larger.

Specifically, the other users may include users who the user registers as acquaintances and users located in the same space as the user.

Specifically, a weighted value for determining the space reliability for each visit of the authentication-processing space may be assigned to the other users, and the weighted values may be determined based on at least one of a number of times that it is identified that the user and the other users are located in an identical space in each visit and the time during which it is identified that the user and the other user are located in the same space in each visit.

Specifically, the determination unit may determine space reliability by assigning a weighted value for each visit time point at which the user and the other users visit the authentication-processing space in each visit.

Specifically, the control command may include omitting, when the user authentication is successful, additional user authentication required within an allowable distance from the authentication-processing space and within an allowable time after the time point at which the authentication is successful according to a preset additional authentication condition.

Specifically, the additional authentication condition may be set to be a wider allowable distance and a longer allowable time as the space reliability is higher.

In accordance with another aspect of the present disclosure, a method of operating an authentication control device is provided. The method includes: an identification step of identifying an authentication-processing space, which is a space in which the authentication of the user is processed; a determination step of determining space reliability on the basis of a correlation between the authentication-processing space and the user; and a control step of authenticating the user through an authentication scheme that is determined differently according to the space reliability for the authentication-processing space.

Specifically, the correlation between the authentication-processing space and the user may be based on the number of times that at least one of the user and other users who are associated with the user visit the authentication-processing space, and the determination command may include determining that the space reliability for the authentication-processing space is higher as the number of visits is larger.

Specifically, the other users may include users who the user registers as acquaintances and users located in the same space as the user.

Specifically, a weighted value for determining the space reliability for each visit of the authentication-processing space may be assigned to the other users, and the weighted values may be determined based on at least one of a number of times that it is identified that the user and the other users are located in an identical space in each visit and a time during which it is identified that the user and the other user are located in the same space in each visit.

Specifically, when the user authentication is successful, the control step may include omitting additional user authentication required within an allowable distance from the authentication-processing space and within an allowable time after the time point at which the authentication is successful according to a preset additional authentication condition.

According to an authentication control device and a method of operating the same according to an embodiment of the present disclosure, it is possible to increase security and convenience in user authentication by authenticating a user through an authentication scheme that is determined differently according to space reliability of an authentication-processing space, which is a space in which user authentication is processed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
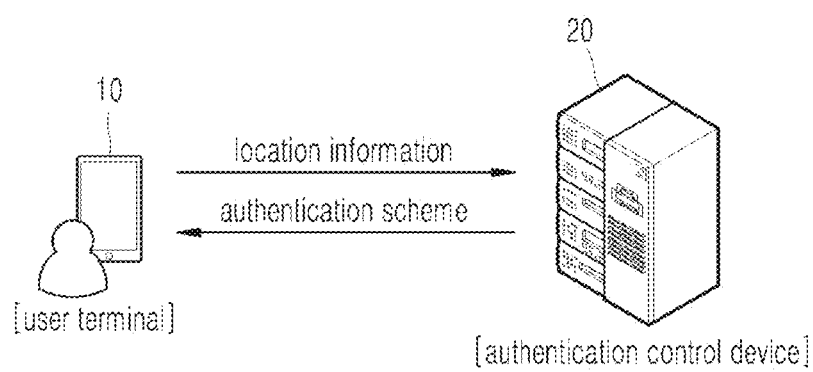
FIG. 1 illustrates the schematic configuration of an authentication control system according to an embodiment of the present disclosure.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

Hereinafter, exemplary embodiments of the present disclosure will be described in detail with reference to the accompanying drawings, equal or similar elements are assigned an equal reference numeral, and an overlapping description thereof will be omitted. Further, in the following description of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the spirit of the present disclosure should not be construed as being limited by the accompanying drawings. In addition to the accompanying drawings, the spirit of the present disclosure should be construed to cover all modifications, equivalents, and alternatives thereof.

Hereinafter, an embodiment of the present disclosure will be described with reference to the accompanying drawings.

FIG. 1 illustrates an authentication control system according to an embodiment of the present disclosure.

As illustrated in FIG. 1, the authentication control system according to an embodiment of the present disclosure may include a user terminal 10 possessed by a user and an authentication control device 20 configured to determine an authentication scheme for the user that is performed by the user terminal 10.

The terminal 10 is a user terminal having an application for user authentication installed therein and may transmit its own location information to the authentication control device 20 through the installed application.

The time point at which the location information is transmitted may be periodic or may be determined as the time point at which authentication for predetermined payment is required.

The application may be, for example, an application dedicated to user authentication or an application supporting a payment operation using payment information (for example, card information or personal information) stored in the user terminal 10 in connection with other services.

The authentication control device 20 is a device that determines an authentication scheme for the user and controls the user terminal 10 to authenticate the user according to the determined authentication scheme.

The authentication control device 20 may be implemented in the form of, for example, a web server, a database server, or a proxy server, or may be implemented as a computerized system through installation of one or more of various pieces of software that allow a network load distribution mechanism or the service device to operate over the Internet or another network. Further, the network may be an http network, a private line, an intranet, or another network, and a connection between elements within an authentication control system according to an embodiment of the present disclosure may be made through a security network to prevent data from being compromised by an arbitrary hacker or another third party.

The authentication control system according to an embodiment of the present disclosure may authenticate the user according to the authentication scheme determined for the user in a mobile environment using the user terminal 10 through the above-described configuration.

Meanwhile, as described in the prior art in connection therewith, the conventional authentication scheme is a scheme using an ID and a password.

The ID and password scheme known as "what you know" authenticates the user by sharing an ID and a password between the user and a server.

Thereafter, authentication such as a One-Time Password (OTP) or an accredited certificate, called "what you have," has been introduced, and markets have formed based thereon.

Until now, the development of a means for authenticating the user has been accompanied not only by improved security but also by reduced convenience, and thus there is a trade-off relationship therebetween.

Particularly, as authentication environment exposure recently increases in a mobile environment, it is important to guarantee an authentication scheme for removing security threats while also securing convenience.

Accordingly, an embodiment of the present disclosure proposes a new authentication scheme of guaranteeing both security and convenience in the mobile environment.

Specifically, the user is authenticated through an authentication scheme that is determined differently according to space reliability for an authentication-processing space, which is a space in which user authentication is processed, and hereinafter the configuration of the authentication control device 20 for implementing the authentication scheme will be described in more detail.

Meanwhile, for helping understand the description, the configuration of the user terminal 10 will be described prior to the description of the authentication control device 20.

Figure 2:
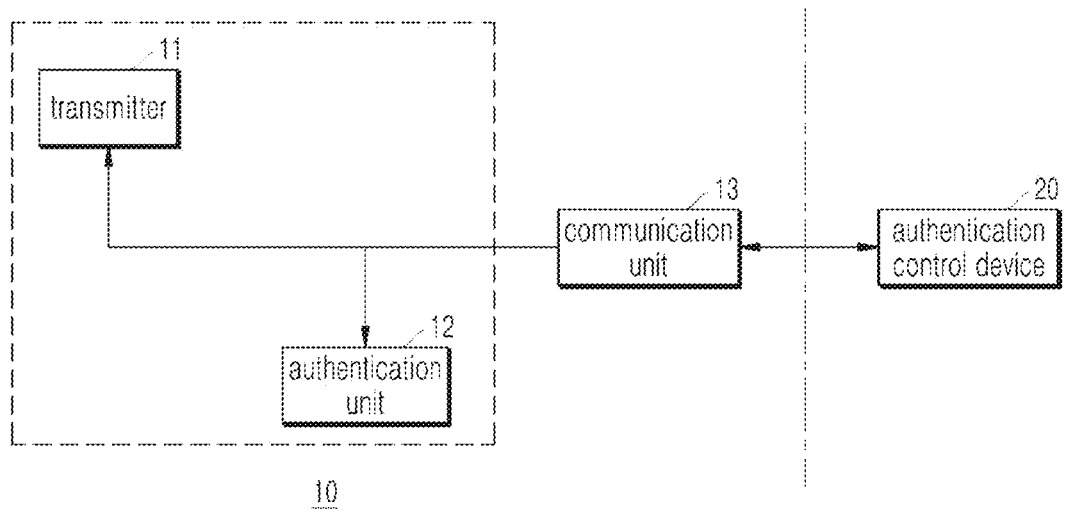
FIG. 2 is a block diagram schematically illustrating a user terminal according to an embodiment of the present disclosure.

FIG. 2 is a block diagram illustrating the user terminal 10 according to an embodiment of the present disclosure.

As illustrated in FIG. 2, the user terminal 10 according to an embodiment of the present disclosure may include a transmitter 11 configured to transmit location information and an authentication unit 12 configured to authenticate a user according to an authentication scheme determined for the user.

All or at least some of the elements of the user terminal 10 including the transmitter 11 and the authentication unit 12 may be implemented in the form of a software (application) module or a hardware module executed by a processor or a combination of a software module and a hardware module.

Meanwhile, the user terminal 10 according to an embodiment of the present disclosure may further include a communication unit 13 configured to serve an RF function for actual communication with the authentication control device 20 as well as the above-described elements.

For reference, the configuration of the communication unit 13 is the configuration corresponding to a communication unit 1310 described with reference to FIG. 4, so a detailed description thereof will be made below.

As a result, the user terminal 10 according to an embodiment of the present disclosure may receive a authentication service from the authentication control device 20 based on the above-described configuration, and, hereinafter, the elements within the user terminal 10 for implementing the authentication service will be described in more detail.

The transmitter 11 performs a function of transmitting location information.

More specifically, the transmitter 11 acquires location information of the user terminal 10 and transfers the location information to the authentication control device 20.

At this time, the transmitter 11 may acquire location information according to a period configured in an application or a request from the authentication control device 20, or may acquire location information when an authentication scheme for payment processing is required and transmit the location information to the authentication control device 20.

Here, the location information may include, for example, AP access information and GPS information, and may be transferred to the authentication control device 20 together with visual information of the acquired location information while matching identification information (a subscriber ID) of the user terminal 10.

The authentication unit 12 performs a function of authenticating the user.

More specifically, the authentication unit 12 authenticates the user according to the authentication scheme determined by the authentication control device 20 when the authentication scheme for payment processing is required.

Here, the authentication scheme may include biometric authentication such as, for example, a password, a fingerprint, a face, a voice, and iris recognition, and may be determined differently according to the reliability determined for an authentication-processing space, which is a space in which authentication is processed.

That is, for the authentication scheme according to an embodiment of the present disclosure, it may be understood that an authentication scheme at a higher security level is determined as space reliability is lower and that an authentication scheme at a lower security level is determined as space reliability is higher.

In connection with this, the authentication control device 20 may determine the authentication scheme for the user with reference to the location information received from the user terminal 10 and transfer the determined authentication scheme to the user terminal 10 to allow the authentication unit 12 to authenticate the user according to the transferred authentication scheme.

Specifically, when it is identified, from the user terminal 10, that user authentication is requested, the authentication control device 20 identifies an authentication-processing space, which is a space in which user authentication is processed based on the location information of the user terminal 10, and determine space reliability for the identified authentication-processing space.

Here, the space reliability is based on a correlation between the authentication-processing space and the user, that is, the number of times that the user and at least one of other users who are acquaintances of the user visit the authentication-processing space.

That is, the authentication control device 20 may determine the space reliability for the authentication-processing space based on the number of times that the user and at least one of other users who are acquaintances of the user visit the authentication-processing space, and the space reliability may be determined to be higher as the number of visits is larger.

This is an example, and it may be understood that the space reliability of a franchise store which the user initially visits may be determined to be low, and when the number of visits increases later, may be determined to be high.

As described above, in order to use the number of visits of the user and other users for determining the space reliability, it is required to define other users who are acquaintances of the user. The other users may be defined as including users (for example, family) who the user has already registered as acquaintances and users located in the same space as the user.

Here, the other users located in the same space as the user may be identified through a scheme of identifying other others from an image (a photo or a moving image) registered in, for example, a user's SNS account or, conversely, a scheme of analyzing the user from an image (a photo or a moving image) registered in an SNS account of the other users, or a scheme of identifying other users of which location information is acquired in the same space when location information of the user is acquired.

For reference, the scheme of identifying the users (other users) from the image (photo or moving image) registered in the SNS account may use a known face recognition technology.

Meanwhile, in using the number of visits of the user and other users who are acquaintances of the user for determining the space reliability, the authentication control device 20 is required to take data reliability for each visit of each of the user and the other users into consideration.

To this end, when determining space reliability, the authentication control device 20 may additionally reflect a weighted value (for example, 0.1 to 0.9) in the number of visits of other users having low data reliability.

At this time, the weighted value of the other user may be determined based on at least one of the number of times that it is identified that the other user and the user are located in the same space in each visit and the time during which it is identified that the user and the other user are located in the same space in each visit.

The weighted value of the other user may be determined to be a higher value as the number of times that it is identified that the other user and the user are located in the same space in each visit is larger or as the time during which it is identified that the other user and the user are located in the same space in each visit is longer.

Further, the authentication control device 20 may additionally consider the time point of each visit in order to reflect data reliability for each visit of the user and other users.

To this end, the authentication control device 20 may assign the weighted value (for example, 0.1 to 0.9) to each visit time point at which the user and other users visit the authentication-processing space in each visit and determine space reliability.

At this time, the weighted value for each visit may be set to a higher value as the time point of each visit is close to the time point at which space reliability is determined.

For reference, as described above, it may be understood that assigning the higher weighted value to the visit time point closer to the time point at which space reliability is determined serves to reflect the recent movement tendencies of the user and other users.

Further, when the space reliability for the authentication-processing space is determined through the scheme, the authentication control device 20 may determine an authentication scheme for the user according to the determination result of the space reliability and transfer the determined authentication scheme to the user terminal 10, thereby allowing the authentication unit 12 within the user terminal 10 to authenticate the user through the transferred authentication scheme.

Figure 3:
FIG. 3 illustrates an authentication scheme according to an embodiment of the present disclosure.

Meanwhile, the authentication scheme that is determined differently according to the space reliability may be selected as a single authentication scheme, as illustrated in FIG. 3A, according to the security level thereof, that is, the determined space reliability, or may be determined in the form of a combination of two or more authentication schemes, as illustrated in FIGS. 3B and 3C.

For reference, in connection with this, when the user authentication is successful according to the authentication scheme transferred from the authentication control device 20, the authentication unit 12 transmits payment information stored in the terminal 10 through a network or processes subsequent operations of transferring the payment information to a POS located at the authentication-processing space.

Meanwhile, each element within the user terminal 10 may be implemented in the form of a software module or a hardware module executed by a processor or in the form of a combination of a software module and a hardware module.

As described above, the software module and the hardware module executed by the processor and the combination of the software module and the hardware module may be implemented by a hardware system (for example, a computer system).

Accordingly, a hardware system 1000 in which the user terminal 10 according to an embodiment of the present disclosure is implemented in hardware form will be described below with reference to FIG. 4.

For reference, the following description is an example of the hardware system 1000 in which respective elements within the user terminal 10 are implemented, and it should be noted that each element and the operation thereof may be different from those in the actual system.

Figure 4:
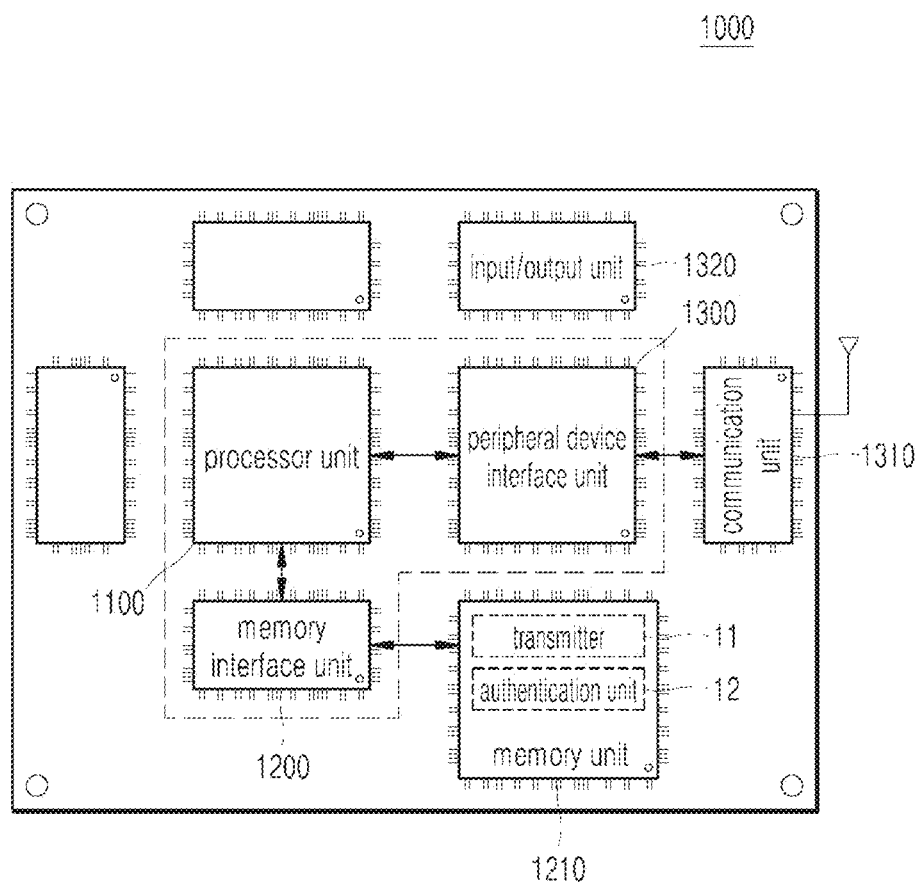
FIG. 4 illustrates a hardware system for implementing the user terminal according to an embodiment of the present disclosure.

As illustrated in FIG. 4, the hardware system 1000 according to an embodiment of the present disclosure may include a processor unit 1100, a memory interface unit 1200, and a peripheral device interface unit 1300.

The respective elements within the hardware system 1000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by appropriate bridges, adaptors, and/or controllers.

The processor unit 1100 may serve to execute various software modules stored in the memory unit 1210 by communicating with the memory unit 1210 through the memory interface unit 1200 in order to perform various functions in the hardware system.

The memory unit 1210 may store the transmitter 11 and the authentication unit 12, which are the elements of the user terminal 10 described with reference to FIG. 2 in the software module form, and may further store an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 1210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral device interface unit 1300 serves to enable communication between the processor unit 1100 and peripheral devices.

The peripheral device may provide different functions to the hardware system 1000 and may include, for example, a communication unit 1310 and an input/output unit 1320 according to an embodiment of the present disclosure.

The communication unit 1310 serves to provide a communication function with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 1310 may include, for example, Wireless LAN (WLAN), Digital Living Network Alliance (DLNA), Wireless broadband (WiBro), World interoperability for microwave access (WiMAX), Global System for Mobile communication (GSM), Code-Division Multiple Access (CDMA), Code-Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long-Term Evolution (LTE), Long-Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultrasound Communication (USC), Visible Light Communication (VLC), Wi-Fi, and Wi-Fi Direct. Wired communication networks may include wired Local Area Networks (LAN), wired Wide Area Networks (WAN), Power Line Communication (PLC), USB communication, Ethernet, serial communication, and optical fiber/coaxial cable, but are not limited thereto, and may include any protocol that can provide a communication environment with another device.

Further, the input/output unit 1320 may serve as a controller configured to control an I/O device interworking with other hardware systems and may serve to control a GPS for acquiring location information of the user terminal 10 and a display for an interface with the user in an authentication process according to an embodiment of the present disclosure.

As a result, each element within the user terminal 10 stored in the memory unit 1210 of the hardware system 1000 according to an embodiment of the present disclosure in the form of a software module may execute an interface with the communication unit 1310 and the input/output unit 1320 via the memory interface unit 1200 and the peripheral device interface unit 1300 in the form of instructions executed by the processor unit 1100, thereby authenticating the user according to the authentication scheme determined by the authentication control device 20.

The description of the configuration of the user terminal 10 according to an embodiment of the present disclosure has been completed, and the configuration of the authentication control device 20 will be subsequently described.

Figure 5:
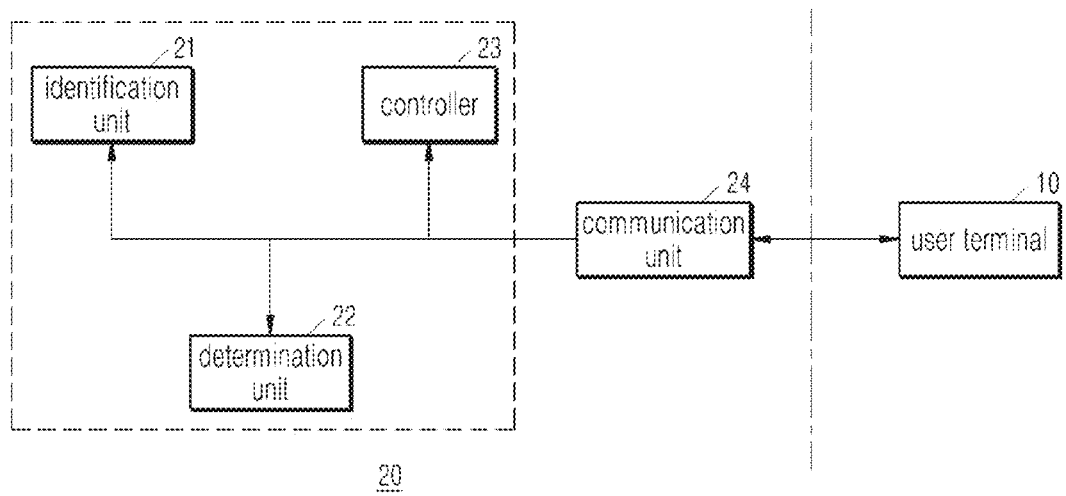
FIG. 5 is a block diagram schematically illustrating an authentication control device according to an embodiment of the present disclosure.

FIG. 5 is a block diagram schematically illustrating the authentication control device 20 according to an embodiment of the present disclosure.

As illustrated in FIG. 5, the authentication control device 20 according to an embodiment of the present disclosure may include an identification unit 21 configured to identify an authentication-processing space, a determination unit 22 configured to determine space reliability, and a controller 23 configured to perform authentication according to an authentication scheme determined based on the space reliability.

All or at least some of the elements of the authentication control device 20 including the identification unit 21, the determination unit 22, and the controller 23 may be implemented in the form of a software module or a hardware module executed by the processor or a combination of the software module and the hardware module.

Here, the software module may be understood as, for example, instructions executed by the processor configured to control calculations within the authentication control device 20, and the instructions may take a form installed in memory within the authentication control device 20.

Meanwhile, the authentication control device 20 according to an embodiment of the present disclosure may further include a communication unit 24, which is an RF module configured to support actual communication with the user terminal 10 as well as the above-described elements.

For reference, the configuration of the communication unit 24 is the configuration corresponding to a communication unit 2310 described with reference to FIG. 6, so that a detailed description thereof will be made below As a result, the authentication control device 20 according to an embodiment of the present disclosure may authenticate the user through an authentication scheme that is determined differently according to space reliability determined for an authentication-processing space through the above-described configuration, and, hereinafter, each element within the authentication control device 20 for implementing the authentication will be described in more detail.

The identification unit 21 performs a function of identifying the authentication-processing space.

More specifically, the identification unit 21 identifies the authentication-processing space, which is a space in which user authentication is processed based on location information of the user terminal 10 when an authentication scheme for payment processing is requested from the user terminal 10.

Meanwhile, in connection with this, the user terminal 10 may acquire location information according to a period configured in an application or a request from the authentication control device 20, or may acquire location information when the authentication scheme for payment processing is requested and transmit the location information to the authentication control device 20.

Here, the location information may include, for example, AP access information and GPS information, and may be transferred to the authentication control device 20 together with visual information of the acquired location information while matching identification information (a subscriber ID) of the user terminal 10.

The determination unit 22 performs a function of determining space reliability for the authentication-processing space.

More specifically, when the authentication-processing space is identified, the determination unit 22 identifies space reliability on the basis of correlation between the identified authentication-processing space and the user.

Here, the space reliability is based on a correlation between the authentication-processing space and the user, that is, the number of times that the user and at least one of other users who are acquaintances of the user visit the authentication-processing space.

That is, the determination unit 22 may determine the space reliability for the authentication-processing space based on the number of times that the user and at least one of other users who are acquaintances of the user visit the authentication-processing space, and the space reliability may be determined to be higher as the number of visits is larger.

This is an example, and it may be understood that the space reliability of a franchise store that the user initially visits may be determined to be low, and when the number of visits increases later, may be determined to be high.

As described above, in order to use the number of visits of the user and other users for determining the space reliability, it is required to define other users who are acquaintances of the user. The other users may be defined to include users (for example, family) who the user has already registered as acquaintances and users located in the same space as the user.

Here, the other users located in the same space as the user may be identified through a scheme of identifying other others from an image (a photo or a moving image) registered in, for example, a user's SNS account or, conversely, a scheme of analyzing the user from an image (a photo or a moving image) registered in an SNS account of the other users, or a scheme of identifying other users of which location information is acquired in the same space when location information of the user is acquired.

For reference, the scheme of identifying the users (other users) from the image (photo or moving image) registered in the SNS account may use a known face recognition technology.

Meanwhile, when using the number of visits of the user and other users who are acquaintances of the user for determining space reliability, the determination unit 22 is required to reflect data reliability for each visit of each of the user and the other users.

To this end, when determining the space reliability, the determination unit 22 may additionally reflect a weighted value (for example, 0.1 to 0.9) in each visit of other users having low data reliability.

At this time, the weighted value of another user may be determined based on at least one of the number of times that it is identified that the other user and the user are located in the same space in each visit and the time during which it is identified that the user and the other user are located in the same space in each visit.

The weighted value of the other user may be determined to be a higher value as the number of times that it is identified that the other user and the user are located in the same space in each visit is larger or as the time during which it is identified that the user and the other user are located in the same space in each visit is longer.

Further, the determination unit 22 may additionally consider a visit time point for each visit in order to reflect data reliability for each visit of the user and the other users.

To this end, the determination unit 22 may assign a weighted value (for example, 0.1 to 0.9) for each visit time point at which the user and other users visit the authentication-processing space in each visit and determine space reliability.

At this time, the weighted value for each visit may be set to a higher value as the time point of each visit is closer to a time point at which space reliability is determined.

For reference, as described above, it may be understood that assigning a higher weighted value to a visit time point closer to the time point at which space reliability is determined serves to reflect the recent movement tendencies of the user and other users.

The controller 23 performs a function of authenticating the user.

More specifically, when the space reliability for the authentication-processing space is determined, the controller 23 determines an authentication scheme suitable for the determined space reliability and transfers the determined authentication scheme to the user terminal 10, thereby allowing the user terminal 10 to authenticate the user through the transferred authentication scheme.

Here, the authentication scheme may include biometric authentication such as, for example, a password, a fingerprint, a face, a voice, and iris recognition, and may be determined differently according to space reliability determined for the authentication-processing space, which is the space in which authentication is processed.

That is, for the authentication scheme according to an embodiment of the present disclosure, it may be understood that an authentication scheme at a higher security level is determined as space reliability is lower and that an authentication scheme at a lower security level is determined as space reliability is higher.

For reference, the authentication scheme that is determined differently according to the space reliability may be selected as a single authentication scheme as illustrated in FIG. 3A according to the security level thereof, that is, the determined space reliability, or may be determined in the form of a combination of two or more authentication schemes as illustrated in FIGS. 3B and 3C.

When the user authentication is successful according to the transferred authentication scheme, the user terminal 10 transmits payment information stored in the terminal 10 through a network or processes subsequent operations of transferring the payment information to a POS located in the authentication-processing space.

Meanwhile, the user terminal 10 may receive a request for additionally authenticating the user after the user authentication is successful in an embodiment of the present disclosure.

In connection with this, when additional user authentication is requested from the user terminal 10 after the user authentication is successful, the controller 23 may omit additional user authentication requested within an allowable distance from the authentication-processing space and an allowable time after the time point at which the authentication is successful according to a preset additional authentication condition.

Here, the additional authentication condition aims at increasing convenience and preventing user authentication from being repeated, and a wider allowable distance and a longer allowable time may be configured as the space reliability is higher.

Meanwhile, each element within the authentication control device 20 may be implemented in the form of a software module or a hardware module executed by a processor or in the form of a combination of a software module and a hardware module.

As described above, the software module and the hardware module, executed by the processor, and the combination of the software module and the hardware module may be implemented by a hardware system (for example, a computer system).

Accordingly, a hardware system 2000 in which the authentication control device 20 according to an embodiment of the present disclosure is implemented in a hardware form will be described below with reference to FIG. 6.

For reference, the following description is an example of the hardware system 2000 in which respective elements within the authentication control device 20 are implemented, and it should be noted that each element and the operation thereof may be different from those in the actual system.

Figure 6:
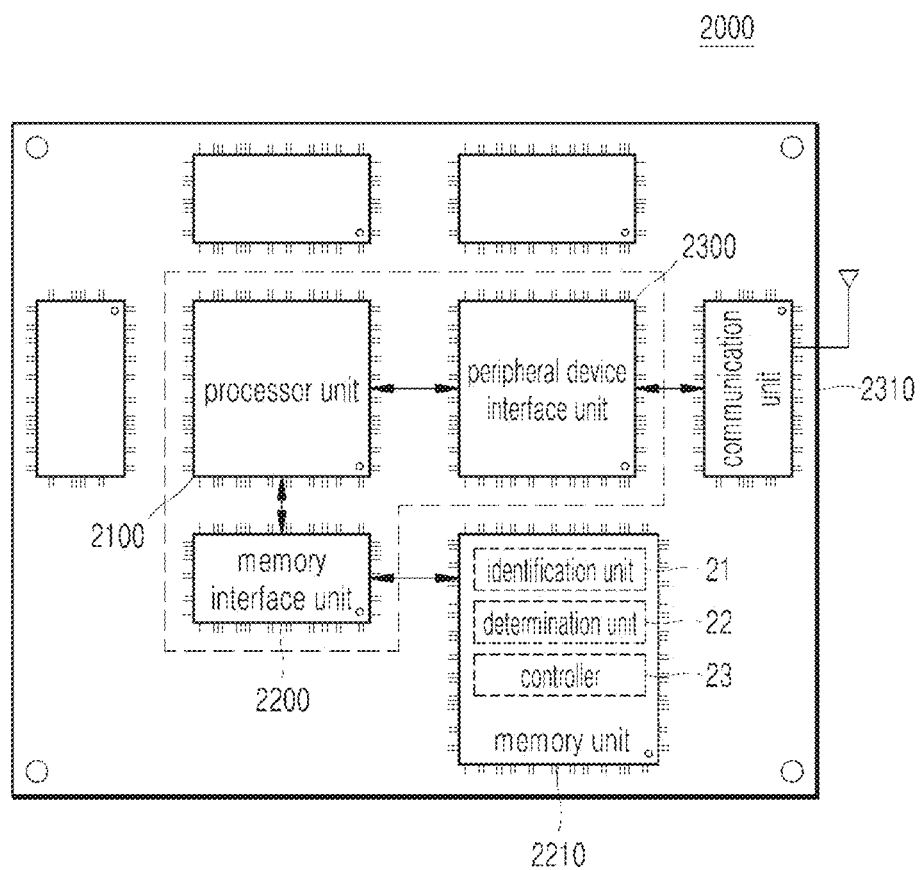
FIG. 6 illustrates a hardware system for implementing the authentication control device according to an embodiment of the present disclosure.

As illustrated in FIG. 6, the hardware system 2000 according to an embodiment of the present disclosure may include a processor unit 2100, a memory interface unit 2200, and a peripheral device interface unit 2300.

The respective elements within the hardware system 2000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by appropriate bridges, adaptors, and/or controllers.

The processor unit 2100 may serve to execute various software modules stored in the memory unit 2210 by communicating with the memory unit 2210 through the memory interface unit 2200 in order to perform various functions in the hardware system.

The memory unit 2210 may store the identification unit 21, the determination unit 22, and the controller 23, which are the elements within the authentication control device 20 described with reference to FIG. 5, in the software module form, and may further include an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 2210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral interface unit 2300 serves to enable communication between the processor unit 2100 and peripheral devices.

The peripheral device may provide different functions to the hardware system 2000, and may include, for example, a communication unit 2310 according to an embodiment of the present disclosure.

The communication unit 2310 serves to provide a communication function with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 2310 may include, for example, Wireless LAN (WLAN), Digital Living Network Alliance (DLNA), Wireless broadband (WiBro), World interoperability for microwave access (WiMAX), Global System for Mobile communication (GSM), Code-Division Multiple Access (CDMA), Code-Division Multiple Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long-Term Evolution (LTE), Long-Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultrasound Communication (USC), Visible Light Communication (VLC), Wi-Fi, and Wi-Fi Direct. Wired communication networks may include a wired Local Area Network (LAN), a wired Wide Area Network (WAN), Power Line Communication (PLC), USB communication, Ethernet, serial communication, and optical fiber/coaxial cable, but are not limited thereto, and may include any protocol that can provide a communication environment with another device.

As a result, each element within the authentication control device 20 stored in the memory unit 2210 of the hardware system 2000 according to an embodiment of the present disclosure in the software module form may execute an interface with the communication unit 2310 via the memory interface unit 2200 and the peripheral device interface unit 2300 in the form of instructions executed by the processor unit 2100, thereby authenticating the user through an authentication scheme that is determined differently according to space reliability determined for the authentication-processing space.

As described above, according to the authentication control system according to an embodiment of the present disclosure and each element within the system, it is possible to increase security and convenience in user authentication by authenticating the user through the authentication scheme that is determined differently according to the space reliability of the authentication-processing space, which is the space in which user authentication is processed.

Hereinafter, an operation flow in the authentication control system according to an embodiment of the present disclosure will be described.

Figure 7:
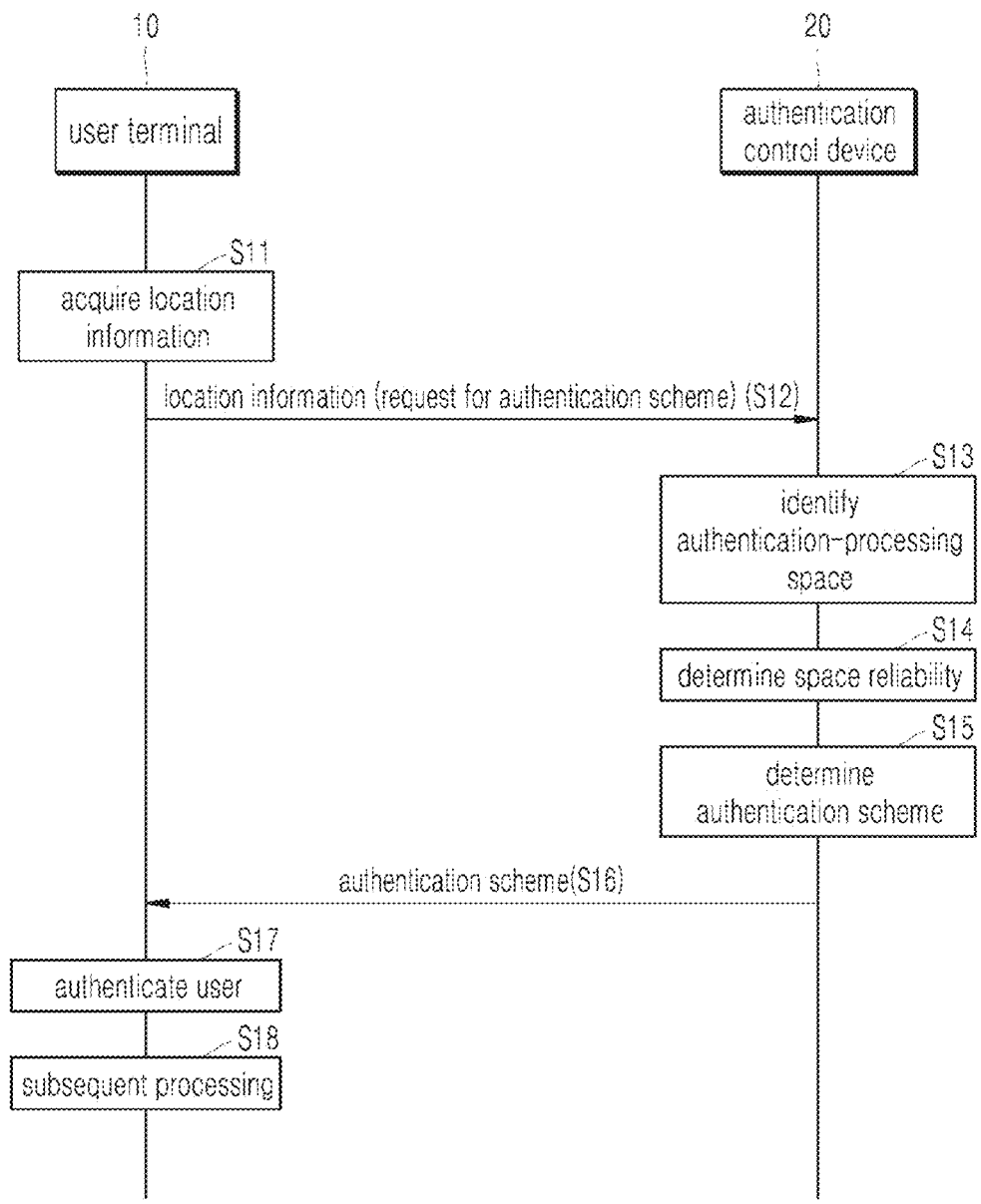
FIG. 7 is a flowchart schematically illustrating an operation flow in the authentication control system according to an embodiment of the present disclosure.

In connection with this, FIG. 7 illustrates the operation flow in the authentication control system according to an embodiment of the present disclosure.

First, the user terminal 10 acquires location information according to a period configuration in an application or a request from the authentication control device 20, or acquires location information when an authentication scheme for payment processing is requested and transmits the location information to the authentication control device 20 in S11 to S12.

Here, the location information may include, for example, AP access information and GPS information, and may be transferred to the authentication control device 20 together with visual information of the acquired location information while matching identification information (a subscriber ID) of the user terminal 10.

Then, the authentication control device 20 identifies an authentication-processing space, which is a space in which user authentication is processed based on the location information of the user terminal 10.

When the authentication-processing space is identified, the authentication control device 20 identifies space reliability on the basis of a correlation between the identified authentication-processing space and the user in S14.

Here, the space reliability is based on a correlation between the authentication-processing space and the user, that is, the number of times that the user and at least one of other users who are acquaintances of the user visit the authentication-processing space.

That is, the authentication control device 20 may determine the space reliability for the authentication processing space based on the number of times by which the user and at least one of other users who are acquaintances of the user visit the authentication processing space, and the space reliability may be determined to be higher as the number of visits is larger.

This is an example, and it may be understood that the space reliability of a franchise store that the user initially visits may be determined to be low, and when the number of visits increases later, may be determined to be high.

As described above, in order to use the number of visits of the user and other users for determining the space reliability, it is required to define other users who are acquaintances of the user. The other users may be defined to include users (for example, family) who the user has already registered as acquaintances and users located in the same space as the user.

Further, when the space reliability for the authentication-processing space is determined, the authentication control device 20 determines an authentication scheme suitable for the determined space reliability and transfers the determined authentication scheme to the user terminal 10, thereby allowing the user terminal 10 to authenticate the user according to the transferred authentication scheme in S15 to S17.

Here, the authentication scheme may include biometric authentication such as, for example, a password, a fingerprint, a face, a voice, and iris recognition, and may be determined differently according to space reliability determined for the authentication-processing space, which is the space in which authentication is processed.

That is, for the authentication scheme according to an embodiment of the present disclosure, it may be understood that an authentication scheme at a higher security level is determined as space reliability is lower and that an authentication scheme at a lower security level is determined as space reliability is higher.

For reference, the authentication scheme that is determined differently according to the space reliability may be selected as a single authentication scheme, as illustrated in FIG. 3A according to the security level thereof, that is, the determined space reliability, or may be determined in the form of a combination of two or more authentication schemes, as illustrated in FIGS. 3B and 3C.

Thereafter, when the user authentication is successful according to the transferred authentication scheme, the user terminal 10 transmits payment information stored in the terminal 10 through a network or processes subsequent operations of transferring the payment information to a POS located in the authentication-processing space.

The description for the operation flow in the authentication control system according to an embodiment of the present disclosure has been completed, and an operation flow in the user terminal 10 will be subsequently described.

Figure 8:
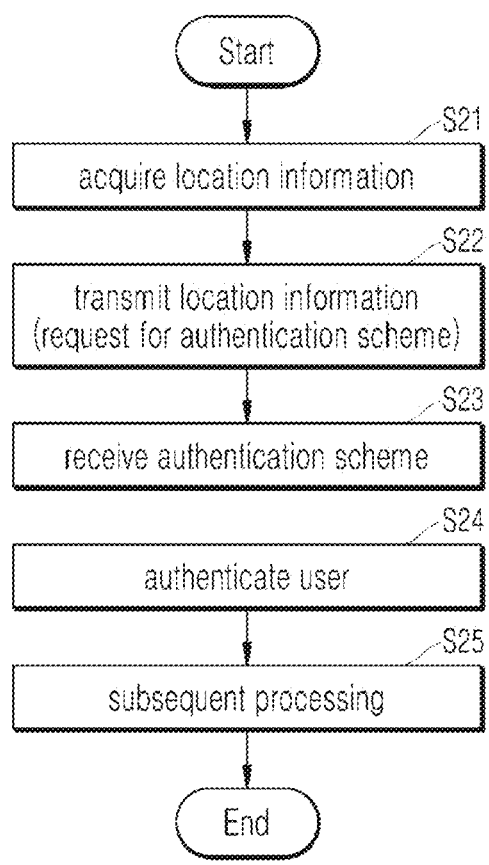
FIG. 8 is a flowchart schematically illustrating an operation flow in the user terminal according to an embodiment of the present disclosure.

In connection with this, FIG. 8 illustrates the operation flow in the user terminal 10 according to an embodiment of the present disclosure.

First, the transmitter 11 acquires location information of the user terminal 10 and transfers the location information to the authentication control device 20 in S21 to S22.

At this time, the transmitter 11 may acquire location information according to a period configured in an application or a request from the authentication control device 20, or may acquire location information when an authentication scheme for payment processing is requested and transmit the location information to the authentication control device 20.

Here, the location information may include, for example, AP access information and GPS information, and may be transferred to the authentication control device 20 together with visual information of the acquired location information while matching identification information (a subscriber ID) of the user terminal 10.

Further, the authentication unit 12 authenticates the user according to the authentication scheme received from the authentication control device 20 according to the request for the authentication scheme to perform payment processing in S23 to S24.

Here, the authentication scheme may include biometric authentication such as, for example, a password, a fingerprint, a face, a voice, and iris recognition, and may be determined differently according to the space reliability determined for an authentication-processing space, which is a space in which authentication is processed.

That is, for the authentication scheme according to an embodiment of the present disclosure, it may be understood that an authentication scheme at a higher security level is determined as space reliability is lower and that an authentication scheme at a lower security level is determined as space reliability is higher.

In connection with this, the authentication control device 20 may determine the authentication scheme for the user with reference to the location information received from the user terminal 10 and transfer the determined authentication scheme to the user terminal 10 to allow the authentication unit 12 to authenticate the user according to the transferred authentication scheme.

Specifically, when it is identified that user authentication is requested, the authentication control device 20 identifies an authentication-processing space, which is a space in which user authentication is processed, based on the location information of the user terminal 10, and may determine space reliability for the identified authentication-processing space.

Here, the space reliability is based on a correlation between the authentication-processing space and the user, that is, the number of times that the user and at least one of other users who are acquaintances of the user visit the authentication-processing space.

That is, the authentication control device 20 may determine the space reliability for the authentication-processing space based on the number of times that the user and at least one of other users who are acquaintances of the user visit the authentication-processing space, and the space reliability may be determined to be higher as the number of visits is larger.

This is an example, and it may be understood that the space reliability of a franchise store that the user initially visits may be determined to be low, and when the number of visits increases later, may be determined to be high.

Thereafter, when the user authentication is successful according to the authentication scheme transferred from the authentication control device 20, the authentication unit 12 transmits payment information stored in the terminal 10 through a network or processes subsequent operations of transferring the payment information to a POS located at the authentication-processing space in S25.

The description for the operation flow in the user terminal 10 according to an embodiment of the present disclosure has been completed, and the operation flow in the authentication control device 20 will be subsequently described.

Figure 9:
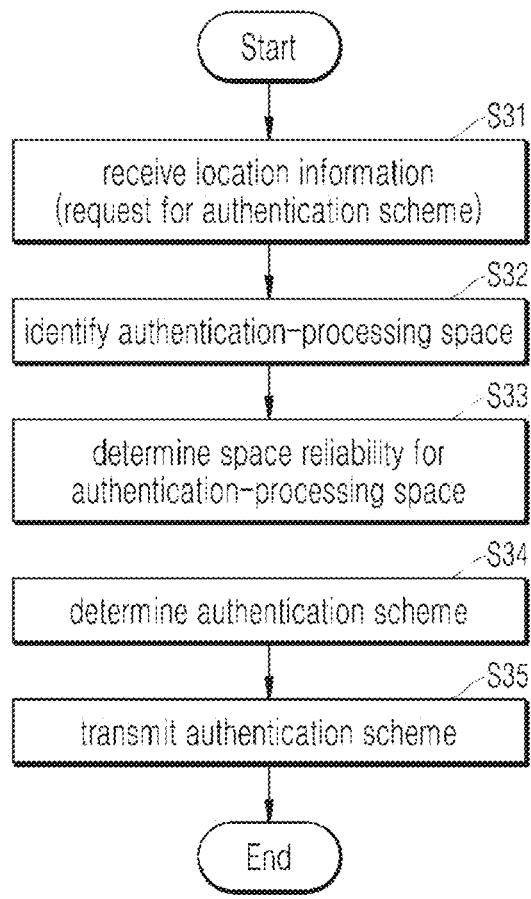
FIG. 9 is a flowchart schematically illustrating an operation flow in the authentication control device according to an embodiment of the present disclosure.

In connection therewith, FIG. 9 illustrates the operation flow in the authentication control device 20 according to an embodiment of the present disclosure.

First, the identification unit 21 identifies the authentication-processing space, which is the space in which user authentication is processed based on the location information of the user terminal 10 when the authentication scheme for payment processing is requested from the user terminal 10 in S31 to S32.

Meanwhile, in connection with this, the user terminal 10 may acquire location information according to a period configured in an application or a request from the authentication control device 20, or may acquire location information when the authentication scheme for payment processing is requested and transmit the location information to the authentication control device 20.

Here, the location information may include, for example, AP access information and GPS information, and may be transferred to the authentication control device 20 together with visual information of the acquired location information while matching identification information (a subscriber ID) of the user terminal 10.

Then, when the authentication-processing space is identified, the determination unit 22 identifies space reliability on the basis of correlation between the identified authentication-processing space and the user in S33.

Here, the space reliability is based on correlation between the authentication-processing space and the user, that is, the number of times that the user and at least one of other users who are acquaintances of the user visit the authentication-processing space.

That is, the determination unit 22 may determine the space reliability for the authentication-processing space based on the number of times that the user and at least one of other users who are acquaintances of the user visit the authentication-processing space, and the space reliability may be determined to be higher as the number of visits is larger.

This is an example, and it may be understood that the space reliability of a franchise store that the user initially visits may be determined to be low, and when the number of visits increases later, may be determined to be high.

As described above, in order to use the number of visits of the user and other users for determining the space reliability, it is required to define other users who are acquaintances of the user. The other users may be defined to include users (for example, family) who the user has already registered as acquaintances and users located in the same space as the user.

Here, the other users located in the same space as the user may be identified through a scheme of identifying other others from an image (a photo or a moving image) registered in, for example, a user's SNS account or, conversely, a scheme of analyzing the user from an image (a photo or a moving image) registered in an SNS account of the other users, or a scheme of identifying other users of which location information is acquired in the same space when location information of the user is acquired.

For reference, the scheme of identifying the users (other users) from the image (photo or moving image) registered in the SNS account may use a known face recognition technology.

Meanwhile, when using the number of visits of the user and other users who are acquaintances of the user for determining space reliability, the determination unit 22 is required to reflect data reliability for each visit of each of the user and the other users.

To this end, when determining the space reliability, the determination unit 22 may additionally apply a weighted value (for example, 0.1 to 0.9) in each visit of other users having low data reliability.

At this time, the weighted value of the other user may be determined based on at least one of the number of times that it is identified that the other user and the user are located in the same space in each visit and the time during which it is identified that the user and the other user are located in the same space in each visit.

The weighted value of the other user may be determined to be a higher value as the number of times that it is identified that the other user and the user are located in the same space in each visit is larger or as the time during which it is identified that the user and the other user are located in the same space in each visit is longer.

Further, the determination unit 22 may additionally consider the time point of each visit in order to reflect data reliability for each visit of the user and the other users.

To this end, the determination unit 22 may assign the weighted value (for example, 0.1 to 0.9) for each visit time point at which the user and other users visit the authentication-processing space in each visit and determine space reliability.

At this time, the weighted value for each visit may be set to a higher value as the time point of each visit is close to a time point at which space reliability is determined.

For reference, as described above, it may be understood that assigning a higher weighted value to a visit time point closer to the time point at which space reliability is determined serves to reflect the recent movement tendencies of the user and other users.

Thereafter, when the space reliability for the authentication-processing space is determined, the controller 23 determines an authentication scheme suitable for the determined space reliability and transfers the determined authentication scheme to the user terminal 10, thereby allowing the user terminal 10 to authenticate the user according to the transferred authentication scheme in S34 to S35.

Here, the authentication scheme may include biometric authentication such as, for example, a password, a fingerprint, a face, a voice, and iris recognition, and may be determined differently according to the space reliability determined for the authentication-processing space, which is the space in which authentication is processed.

That is, for the authentication scheme according to an embodiment of the present disclosure, it may be understood that an authentication scheme at a higher security level is determined as space reliability is lower and that an authentication scheme at a lower security level is determined as space reliability is higher.

For reference, the authentication scheme that is determined differently according to the space reliability may be selected as a single authentication scheme, as illustrated in FIG. 3A according to the security level thereof, that is, the determined space reliability, or may be determined in the form of a combination of two or more authentication schemes, as illustrated in FIGS. 3B and 3C.

When the user authentication according to the transferred authentication scheme is successful, the user terminal 10 transmits payment information stored in the terminal 10 through a network or processes subsequent operations of transferring the payment information to a POS located at the authentication-processing space.

Meanwhile, the user terminal 10 may receive a request for additionally authenticating the user after the user authentication is successful in an embodiment of the present disclosure.

In connection with this, when additional user authentication is requested from the user terminal 10 after the user authentication is successful, the controller 23 may omit additional user authentication requested within an allowable distance from the authentication-processing space and an allowable time after the time point at which the authentication is successful according to a preset additional authentication condition.

Here, the additional authentication condition aims at increasing convenience and preventing the user authentication from being repeated, and a wider allowable distance and a longer allowable time may be configured as the space reliability is higher.

As described above, according to the authentication control system according to an embodiment of the present disclosure and the method of operating each element within the system, it is possible to increase security and convenience in user authentication by authenticating the user through an authentication scheme that is determined differently according to the space reliability of the authentication-processing space, which is the space in which user authentication is processed.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the terms "system" and "device", for example, cover a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. An apparatus for controlling authentication, the apparatus comprising:
a processor configured to process authentication of a user; and
a memory configured to store at least one command executed through the processor, wherein the at least one command comprises:
  an identification command of identifying an authentication-processing space, which is a space in which the authentication of the user is processed;
  a determination command of determining space reliability for the authentication-processing space based on a correlation between the authentication-processing space and the user;
  a selection command of selecting an authentication scheme for authenticating the user that is determined differently according to the space reliability for the authentication-processing space; and
  an authentication command that authenticates the user based on the selected authentication scheme,
  wherein the correlation between the authentication-processing space and the user is determined based on a number of times that the user and one or more other users who are associated with the user visit the authentication-processing space, and
  wherein the correlation between the authentication-processing space and the user is determined based on weighted values that are determined, respectively, for visits by the user and the one or more other users to the authentication-processing space, and the weighted values for the visits are determined based on whether both the user and at least one of the other users are at the authentication-processing space at a same time, lengths of time that the user and the one or more other users are at the authentication-processing space during the visits, and proximity of time points of the visits to a present time.

2. The apparatus of claim 1, wherein the determination command comprises determining that the space reliability for the authentication-processing space is higher as the number of the visits is larger.

3. The apparatus of claim 1, wherein the other users include at least one of a person who the user registers as acquaintances or a person located at an identical space as the user.

4. The apparatus of claim 1, wherein, when the user authentication is successful, the determination command comprises omitting additional user authentication required within an allowable distance from the authentication-processing space and within an allowable time after a time point at which the authentication is successful according to a preset additional authentication condition.

5. The apparatus of claim 4, wherein the additional authentication condition is set to be a wider allowable distance and a longer allowable time as the space reliability is higher.

6. A method of operating an authentication control device, the method comprising:
  identifying an authentication-processing space, which is a space in which authentication of a user is processed;
  determining space reliability for the authentication-processing space based on a correlation between the authentication-processing space and the user;
  determining an authentication scheme for authenticating the user, the authentication scheme being determined differently according to the space reliability for the authentication-processing space; and
  authenticating the user based on the determined authentication scheme,
  wherein the correlation between the authentication-processing space and the user is determined based on weighted values that are determined, respectively, for visits by the user and one or more other users who are associated with the user to the authentication-processing space, and the weighted values for the visits are determined based on a number of the visits, whether both the user and at least one of the other users are concurrently at the authentication-processing space during each of the visits, lengths of time that the user and the one or more other users are at the authentication-processing space during the visits, and proximity of time points of the visits to a present time.

7. The method of claim 6, wherein the determining of the space reliability for the authentication-processing space comprises determining that the space reliability for the authentication-processing space is higher as the number of the visits is larger.

8. The method of claim 6, wherein the other users include at least one of a person who the user registers as acquaintances or a person located at an identical space as the user.

9. The method of claim 6, further comprising:
  when the user authentication is successful, determining the authentication scheme for another user authentication based on omitting additional user authentication required within an allowable distance from the authentication-processing space and within an allowable time after a time point at which the authentication is successful according to a preset additional authentication condition.

10. A method authenticating a user, the method comprising:
  identifying, by a terminal, an authentication-processing space in which an authentication of the user is processed;
  receiving, by the terminal, data identifying an authentication scheme for authenticating the user, wherein the authentication scheme is selected based on a space reliability for the authentication-processing space, and the space reliability for the authentication-processing space is determined according to a correlation between the authentication-processing space and the user; and
  authenticating, by the terminal, the user based on the authentication scheme,
  wherein the correlation between the authentication-processing space and the user is determined based on weighted values that are determined, respectively, for visits by the user and one or more other users who are associated with the user to the authentication-processing space,
  wherein the weighted values for the visits are determined based on a number of the visits, whether both the user and at least one of the other users are concurrently at the authentication-processing space during each of the visits, lengths of time that the user and the one or more other users are at the authentication-processing space during the visits, and proximity of time points of the visits to a present time and,
  wherein a first one of the weighted values for a first one of the visits is greater than a second one of the weighted values for a second one of the visits when at least one of:
    the user and at least one of the other users are at the authentication-processing space at a same time during the first visit, and the user and at least one of the other users are not at the authentication-processing space at a same time during the second visit,
    a first length of time that at least one of the user or the other users are at the authentication-processing space during the first visit is greater than a second length of time that the at least one of the user or the other users are at the authentication-processing space during the second visit, or the first visit is more recent than the second visit.

11. The method of claim 10, wherein the space reliability for the authentication-processing space is higher as the number of the visits is larger.

12. The method of claim 10, wherein the other users include at least one of a person who the user registers as acquaintances or a person located at an identical space as the user.

13. The method of claim 10, wherein, when the user authentication is successful, the authenticating comprises omitting additional user authentication required within an allowable distance from the authentication-processing space and within an allowable time after a time point at which the authentication is successful according to a preset additional authentication condition.

\* \* \* \* \*